United States Patent

[11] 3,580,102

| [72] | Inventors | Voyta E. Wrabetz<br>Hubertus;<br>Ronald A. Banister, Mequon, Wis. |
|---|---|---|
| [21] | Appl. No. | 837,813 |
| [22] | Filed | June 30, 1969 |
| [45] | Patented | May 25, 1971 |
| [73] | Assignee | Square D Company<br>Park Ridge, Ill. |

[54] ADJUSTABLE FLEXIBLE CABLE FORCE TRANSMITTING ASSEMBLY
7 Claims, 3 Drawing Figs.

| [52] | U.S. Cl. | 74/501 |
| [51] | Int. Cl. | F16c 1/22 |
| [50] | Field of Search | 74/501, 502<br>287/Inquired |

[56] References Cited
UNITED STATES PATENTS

| 3,195,370 | 7/1965 | Smith | 74/501 |
| 3,393,578 | 7/1968 | Tschanz | 74/501 |
| 3,411,373 | 11/1968 | Zieber et al. | 74/501 |

*Primary Examiner*—Milton Kaufman
*Attorney*—John H. Leonard

ABSTRACT: The flexible cable assembly comprises an outer sheath and inner cable with plungers on its ends, respectively, for transmitting normal operating forces in a direction from an operator at one end of the assembly to a switch at the opposite end. Adjustment means are connected to one plunger and are arranged to be changed in overall length by opposed forces imposed thereon by, and endwise of, the cable in excess of the normal operating forces. The adjustment means is adjusted to the effective length required for proper operation of the switch by the operator by operating the remote operator through one complete operating cycle while the operator, the switch, and the assembly are in final installed position. The effective length remains unchanged thereafter.

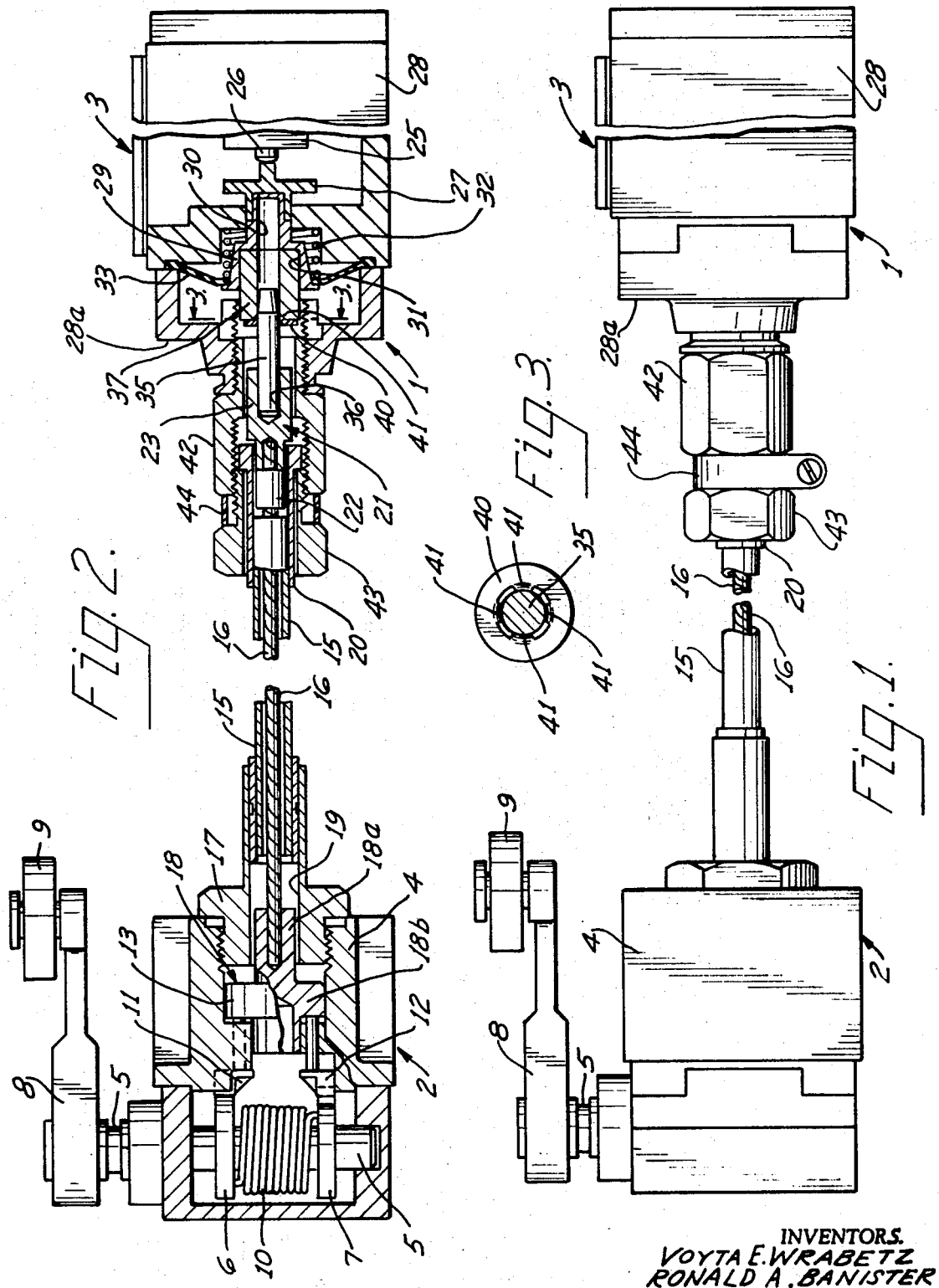

ADJUSTABLE FLEXIBLE CABLE FORCE TRANSMITTING ASSEMBLY

This invention relates to an adjustable, flexible cable force transmitting assembly for connecting a remote operator to a device to be operated thereby, characterized in that the assembly is adjustable, while the assembly, the remote operator, and the device are in final installed relation to each other, by operating the operator through a complete cycle of operation.

For purposes of illustration, the invention is shown as connecting a cam type remote operator with a limit switch, which may be of the general type disclosed in U.S. Pat. No. 3,275,764, of Rudolph E. Kiessling, issued Sept. 27, 1966.

Generally, remote cable operators are used in installations wherein limited space precludes the mounting of a limit switch adjacent the operator, or renders the wiring or servicing of the limit switch in its installed position difficult or time consuming. The principal problem presented in installing a remote operator and switch driven through a flexible cable assembly is due to differences in the distances that the plungers on the ends of the inner cable of the assembly extend outwardly beyond the corresponding ends of the sheath under different degrees of curvature of the assembly.

When the cable assembly is straight, the plungers extend a designed distance beyond the ends of the outer sheath. When the assembly is curved or bent, the sheath, being generally incompressible endwise, bends about a radius from the center of curvature to its surface at the inside of the bend. The bending radius to the inner cable is necessarily greater. Hence, as the assemblage is bent, the ends of the inner cable draw in endwise of, and relative to, the sheath. The cable is said to "shorten" as the assemblage is bent.

Thus it frequently happens that when the operator and switch are installed and the ends of the sheath are connected to the operator and switch, respectively, the spacing of the plungers from each other relative to the spacing of the ends of the sheath has become changed from the relation that existed in the straight condition of the assemblage. Therefore, endwise adjustment of the effective length of the force transmitting part of the assemblage to compensate for these relative changes must be made, otherwise the motion of the operator transmitted to the switch may be incapable of operating the switch in the manner required.

Adjustment to compensate for changes in the effective length of the force transmitting part of the assemblage relative to the outer sheath by conventional means is very difficult and time consuming. The structure of the present invention is arranged so that this adjustment is readily effected after installation of the operator, switch, and assembly merely by operating the operator, and thereby the switch, through one complete cycle of operation.

The self-adjusting feature of the present structure has the advantage that it does not require any externally accessible adjustable mechanisms and, therefore, is tamperproof.

Various additional objects and advantages will become apparent from the following description wherein reference is made to the drawings, in which:

FIG. 1 is a side elevation of the flexible cable assembly drivingly interconnecting a remote operator and a limit switch, parts thereof being shown in section for clearness in illustration;

FIG. 2 is a longitudinal sectional view of the structure illustrated in FIG. 1, parts of the operator, switch, and cable assembly being shown in section for clearness in illustration; and FIG. 3 is an enlarged fragmentary cross-sectional view of part of the cable assembly illustrating part of the adjustment means thereof, and is taken on line 3—3 in FIG. 1.

Referring first to FIG. 1, the flexible cable assembly, indicated generally at 1, is shown for purposes of illustration as connecting a remote operator 2 to a limit switch assembly 3.

The operator comprises a body 4 in which is mounted a rotatable cam shaft 5 carrying cams 6 and 7. The shaft 5 is rotatably driven by a suitable crank 8 on the outer end of which is carried a roller 9 for engagement with the movable control part of a mechanism to be controlled.

The shaft 5 and crank 8 are biased to a neutral position by a spring 10.

The rotary cams 6 and 7 cooperate with lineally movable cam elements 11 and 12, respectively, the cam element 11 being moved in a given direction by the cam 6 when the crank 8 is rocked in one direction from neutral position, and the cam element 12 being moved in the same direction by the cam 7 when the crank is rocked from neutral in the opposite direction. The body 4 has an open bore 13 which is threaded near its outer end for connection with one end of the flexible cable assembly.

The flexible cable assembly comprises an outer sheath 15 and an inner cable 16 mounted in the sheath for axial movement in a conventional manner. The sheath is fixedly secured at one end to a suitable connecting head or nut 17 which is in threaded engagement with the wall of the bore 13 of the body 4. Mounted on that end of the cable 16 which is adjacent the nut 17 is a plunger 18 having a shank 18a slidably axially in, and guided by, the walls of a suitable bore 19 in the nut 17, and having a head 18b. The head extends into, and is movable axially of, a bore in the body 4 and has an outer end facing toward, and engaged for operation by the inner ends of, the cam elements 11 and 12. Thus, upon driving of the cam element 11 or cam element 12 inwardly or to the right in FIG. 2, the plunger 18 is driven to the right and thereby drives the inner cable 16 to the right.

Upon return of the arm 8 to neutral position, the plunger 18 is returned to the left to its starting position by a lineal force transmitted by the cable 16 from the limit switch 3 or such other device as is operated by the remote operator.

Fixedly secured on the opposite end of the sheath 15 is a sleeve 20 through which the cable extends. Mounted on the end of the cable which is within the sleeve 20 is a plunger 21 having a shank portion 22 fixedly connected to the cable 16 and guided by the wall of the bore of the sleeve 20. The plunger 21 has a head 23 disposed outwardly beyond the end of the sleeve 20 and adapted for transmitting force to a pushbutton of the switch assembly 3 upon axial movement of the inner cable 16 to the right.

For purposes of illustration, the switch assembly is shown as including a self-restoring switch 25 having an operating pushbutton 26 and a pushbutton operator 27. The switch 25 may be the conventional make and break self-restoring snap-acting type, such as shown in the above-identified patent, the specific type of switch not being a part of the present invention.

The switch 25 and its pushbutton operator 27 are enclosed in a housing 28, closed at one end by a detachable cap 28a, in position such that the pushbutton 26 and operator 27 are urged to the left in FIG. 2 by a suitable pushbutton return spring, not shown, and an operator return spring to be described.

Mounted in the end wall of the housing 28 for reciprocation endwise of, and relative to, the plunger 21, is an interponent 29, having at one end a stem portion 30 which is drivingly connected by a lost motion connection to the pushbutton operator 27. The interponent 29 has a socket 31 open toward the plunger 21. It is urged toward the plunger 21 by a suitable return spring 32. A resilient annular seal 33 is mounted at its inner periphery on the interponent 29 and its outer periphery is clamped between an end wall of the housing 28 and the closure cap 28a to prevent the infiltration of foreign matter into the housing.

As mentioned, it is desirable that limited adjustments be provided so that the cable 16 can operate the switch 25 properly regardless of the bent or curved condition of the cable 16 and outer sheath 15. For this purpose, adjustment means are maximum to compensate for the different degrees to which plungers 18 and 21 extend beyond their adjacent ends of the sheath 15 due to the different degrees of curvature of the flexible cable assembly, as compared to the degree to which they extend when the sheath is straight.

The adjustment means shown for purposes of illustration act to effect adjustment by collapsing endwise of the cable 16 certain amounts, under forces in excess of normal operating forces transmitted by the cable, as hereinafter described. However, such adjustment means may be so arranged that instead of collapsing, they extend under such excess forces.

The collapsing type of adjustment comprises a force transmitting pin 35 one end of which is receivable in a socket 36 in the plunger 21. The pin 35 is movable axially in the socket 36 and can bottom therein when moved a predetermined distance endwise of the plunger 21 and cable 16 to the left in FIGS. 1 and 2. The outer end of the pin 35 is telescopically accommodated in the bore of a force transmitting sleeve 37 for axial sliding relative to the sleeve. The outer end of the sleeve 37 is received in the socket 31 in the interponent 29 with its bore in coaxial relation with the pin 35, and is slidable axially in the socket 31.

Mounted on the pin 35 is an adjustable abutment 40. The abutment is frictionally retained on the pin against displacement axially by normal operating forces transmitted through the flexible cable assemblage. The abutment 40 is movable axially relative to the pin upon the application to the pin 35 and the abutment 40 of opposed transmitted and reactionary forces in excess of the normal operating forces.

In the form illustrated, the abutment 40 comprises a washer, preferably of spring metal, having a plurality of radially inwardly extending tines 41 at its inner periphery. The tines are in engagement with the periphery of the pin 35 under sufficient yielding pressure to provide frictional forces capable of preventing axial movement of the abutment relative to the pin by the normal operating forces being transmitted by the cable 16. As a result, when one end of the pin is within the socket 36 and the other end of the pin is in the sleeve 37, and the plunger 21 is moved to the right in FIG. 2 by normal operating forces being transmitted through the medium of the cable 16, the pin 35 bottoms in the socket 36 of the plunger 21 and then moves as a unit with the plunger, and relative to the sleeve 37, to the right. This movement causes the abutment 40 to engage the adjacent end of the sleeve 37.

Continued movement of the pin 35 to the right drives the sleeve 37 to the right, causing the sleeve 37 to bottom or seat in the socket 31 of the interponent 29 and then drive the interponent 29 to the right. The movement of the interponent 29 first takes up the lost motion between it and the pushbutton operator 27, and then drives the pushbutton operator 27 to the right so as to cause it to depress the pushbutton 26. The movement of the sleeve 37, interponent 29, and pushbutton operator 27 to the right is arrested by the seating of the pushbutton 26, or, if desired, by seating of the interponent 29 or the pushbutton operator 27 against a wall portion of the housing 28.

If the operation of the plunger 21 toward the switch 25 is continued after arrest of the right-hand movement of the sleeve 37, then the force being applied on the pin 35 by the remote operator 3 and reactionary force applied by the sleeve to the abutment 40 builds up a force in excess of normal urging the pin to the right relative to the abutment 40. The excess force is sufficient to overcome the frictional resistance between the pin 35 and abutment 40 and cause the pin 35 to move to the right relative to the abutment 40. This latter movement continues until the remote operator 2 has been moved to the end of its stroke in either direction from neutral.

Thus, since the sleeve 37 cannot move farther to the right, the pin 35 is pressed farther through the abutment 40 and sleeve 37 until the effective length of the flexible cable assembly force transmitting means is adjusted so that, at the maximum right-hand stroke of the operator 2, the switch pushbutton 26 has been fully depressed to proper operating position. Thus by collapsing the adjustment means provided by the pin 35, abutment 40, and sleeve 37, the effective length of the force transmitting means of the flexible cable assembly is adjusted to compensate for the particular curvature of the sheath.

Since the switch 25 and remote operator 2 have previously been fixedly secured on the equipment with which they are to cooperate and are connected by the flexible cable assembly, the operation of the remote operator through a complete operating cycle adjusts the fully installed assembly so as to compensate for conditions introduced by bending the flexible cable assemblage.

Thereafter, if pressure is removed from the plunger 18, the spring 32 operates through the medium of the sleeve 37, abutment 40, and pin 35 to return the plunger 21 to its proper starting position.

Thus the plungers 18 and 21 and cable 16 provide a force transmitting means in which is incorporated an adjustment means by which the effective length of the force transmitting means is changed by one complete operation of the remote operator to a degree which depends upon the endwise movement of the cable 16 in a direction in which, and while, its transmitting forces are in excess of normal operating forces.

If subsequently the assembly is used with a switch and operator which are differently installed, then the abutment 40 is removed from the pin 35 by pushing the abutment 40 off the extreme left of the pin and reinstalling it, while it is facing in its original direction, on the right-hand end of the pin, and then reintroducing the pin into the bores 36 of the plunger 21 and bore of the sleeve 37.

Thereupon the structure is reconditioned for adjustment in the new installed position of the switch and remote operator by operation of the remote operator through a complete cycle.

The end of the cable assembly adjacent to the housing 28 is secured to the housing by a threaded sleeve nut 42 which is in threaded connection with the cap 28a, and by a threaded sleeve nut 43 which bears against the usual shoulder on the sleeve 20 of the sheath 15 and is in threaded engagement with the sleeve nut 42.

A removable collar 44 is interposed between the heads of the nuts 42 and 43 and carries a tag bearing installation instructions. The housing 28 and remote operator are first installed, and the nut 42 is screwed into fully seated position in the housing 28 while the nuts 42 and 43 are in threaded engagement and bear against opposite ends of the collar. This holds the nut 42 on the sheath 15 while permitting limited axial movement of and free rotation of the sheath relative to the nut 42.

After the installation is made, the collar 44 is removed and the nut 43 is screwed farther into the nut 42 until it fully seats the end of the sheath therein. This collar assures the maintenance of proper positioning of the parts relative to each other during installation to assure proper adjustment in the installed position by movement of the lever 8 through a complete operating cycle after the collar has been removed and the nut 43 has been fully seated in the nut 42.

While we have described our invention as employing an adjustment which is collapsible to a predetermined degree, as above described, the adjustment can be applied so as to operate upon extension to a predetermined degree.

Having thus described our invention, we claim:

1. A flexible cable assembly comprising:
an outer sheath;
force transmitting means, including an inner cable in the sheath and movable endwise relative to the sheath, for transmitting normal forces by endwise movement of the cable;
adjustment means incorporated in the force transmitting means and operable by opposed forces, each in excess of said normal operating forces, applied to the adjustment means endwise of the cable to change the effective length of the force transmitting means to a degree depending upon the endwise movement of the cable in one direction relative to the adjustment means while the cable is transmitting forces in excess of said normal operating forces; and
said adjustment means includes constraining means to constrain the force transmitting means, while subjected to said normal operating forces imposed in said one direction endwise of the cable, to the effective length to which it has been changed by said opposed forces.

2. The structure according to claim 1 wherein the adjustment means is compression resistant and is arranged relative to the force transmitting means to be collapsed by said opposed forces in excess of normal operating forces, and the constraining means is operative to prevent collapse of the adjustment means by said normal operating forces.

3. The structure according to claim 1 wherein the adjustment means comprises two members movable in opposite directions relatively toward and away from each other and abutment means, including two elements movable relative to each other and drivingly connecting the members for transmitting movement from one member to the other in at least one of said directions;

said constraining means secure the two elements together for yieldably resisted movement of the elements relative to each other in said one of said directions under said excess forces to an adjusted position, and for movement of the elements as a unit in said adjusted position in said one of said directions under normal operating forces.

4. The structure according to claim 3 wherein one of said elements is a pin and is movable endwise in at least one direction with one of the members at least when the pin is in one predetermined endwise position relative thereto, and is movable endwise relative to the other member in said one direction, and the other of said elements bears against, and drivingly interconnects, the pin and the other one of the members for movement of the other one of the members thereby in said one direction.

5. The structure according to claim 1 wherein the force transmitting means includes a plunger connected at one end to one end of the inner cable;

said plunger has a bore open at its other end;

a rigid pin is slidably mounted in said bore and is of sufficient length to bottom relative to the plunger while a substantial portion of the pin extends endwise of the pin out of the bore beyond said other end of the plunger;

a sleeve is mounted on the pin and is slidably axially of, and relative to, said pin;

the adjustment means includes an abutment washer mounted on said pin for sliding axially thereof; and said constraining means are carried by the washer and frictionally engage the pin with sufficient force to retain the washer in fixed position axially of the pin against said normal operating forces while the pin remains so bottomed, and to permit movement of the washer along the pin to a different position endwise of the pin by forces applied thereagainst in excess of said normal operating forces while the pin remains bottomed.

6. The structure according to claim 1 including plungers on the opposite ends of the cable, respectively;

the adjustment means are connected to one of said plungers and are positioned to be interposed between the said one of the plungers and a member to be driven thereby, for transmitting forces to the member; and said adjustment means are of predetermined length and sufficiently rigid to retain said predetermined length under normal operating forces transmitted between the plunger and said member, and are collapsible to a lesser length by forces imposed thereon endwise of said one of the plungers in excess of said normal operating forces.

7. The structure according to claim 1 including a sleeve body rigid with the sheath, a plunger connected to the cable and mounted in the sleeve body for reciprocation;

a hollow screw body adapted for threaded engagement with a device to be drivingly associated to the plunger;

a screw plug threadably connected to the screw body and operative to move the sleeve body endwise into the threaded body as the screw plug is screwed into the hollow screw body; and detachable means interposed between the screw body and screw plug for limiting the movement of the screw plug into the screw body to a preselected starting position while the detachable means remains in operative position, whereby the adjustment means is positioned to assure the capability of a predetermined minimum adjustment after the assembly is installed.